United States Patent [19]

Hamanaka et al.

[11] Patent Number: 4,663,750
[45] Date of Patent: May 5, 1987

[54] FOCUS ERROR DETECTION DEVICE FOR AN OPTICAL RECORDING/PLAYING BACK SYSTEM

[75] Inventors: Kenjiro Hamanaka; Shinsaku Nozu; Katsuharu Sato; Hozumi Tanaka, all of Tokorozawa, Japan

[73] Assignee: Pioneer Electronic Corporation, Tokyo, Japan

[21] Appl. No.: 662,037

[22] Filed: Oct. 18, 1984

[30] Foreign Application Priority Data

Oct. 19, 1983 [JP] Japan ............... 58-161697[U]

[51] Int. Cl.$^4$ ............................................. G11B 7/09
[52] U.S. Cl. ......................................... 369/45; 369/46; 250/201
[58] Field of Search .................... 369/44, 45, 46; 250/201 DF

[56] References Cited

U.S. PATENT DOCUMENTS

| 4,057,833 | 11/1977 | Braat | 369/46 |
| 4,163,149 | 7/1979 | Sawano | 369/45 |
| 4,446,545 | 5/1984 | Dijk | 369/46 |

FOREIGN PATENT DOCUMENTS 56-42060 10/1981 Japan .
125241 7/1983 Japan ...................... 369/46

Primary Examiner—Alan Faber
Attorney, Agent, or Firm—Schwartz, Jeffery, Schwaab, Mack, Blumenthal & Evans

[57] ABSTRACT

A focus error detection device to be used in an optical system for recording and/or playing back information, including a light detector made up of four light receiving elements arranged symmetrically with respect to the center of the light detector, a multiplication means for generating a pair of multiplication signal by multiplying output signals of two light receiving elements which are arranged symmetrically with respect to the center of the light detector. The multiplication signals are applied to a subtraction means where the focus error signal is generated by the subtraction between the multiplication signals. Thereby the off-set of the focus error signal which has been caused by the deviation of the position of the center of the light beam from the center of the light detector is by far reduced.

2 Claims, 10 Drawing Figures

FOCUS ERROR DETECTION DEVICE FOR AN OPTICAL RECORDING/PLAYING BACK SYSTEM

BACKGROUND OF THE INVENTION

1. Field of the Invention

The present invention relates to a focus error detection device, and more specifically to a focus error detection device for an optical recording/playing back system.

2. Description of Background Information

In a system for optically recording or playing back information such as a compact disc player system or a video disc player system, it is general to provide a focus servo control system by which a record or a read out light beam is correctly focused on a record medium. Conventional focus error detection devices used in such systems are constructed such that a reflection beam is directed through a cylindrical lens to a light detector made up of a plurality of light receiving elements which are arranged symmetrically with respect to the center of the light detector. The focus error signal is derived by the subtraction between two sum signals each of which being obtained by the summation of output signals of two of the light receiving elements which are arranged symmetrically with respect to the center of the light detector. However, the drawback was that an off-set of the focus error signal is inevitably generated when the direction of the light beam is shifted tangentially or normally to the recording tracks for the purpose of tracking control or jitter correction.

SUMMARY OF THE INVENTION

An object of the present invention is therefore to alleviate the drawback of conventional devices and to provide a focus error detection device which can reduce the off-set of the focus error signal due to the deviation of the position of the light beam on the light detector.

According to the present invention, the focus error detection device is constructed to derive the focus error signal by the subtraction between two multiplication signals obtained by the multiplication between output signals of light receiving elements which are arranged symmetrically with respect to the center of the light detector.

Further scope of applicability of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 9 is a diagram showing a state in which the position of the center of the light beam is extremely shifted from the center of the light receiving surface of the light detector.

DETAILED DESCRIPTION OF PREFERRED EMBODIMENTS

Figure 1:
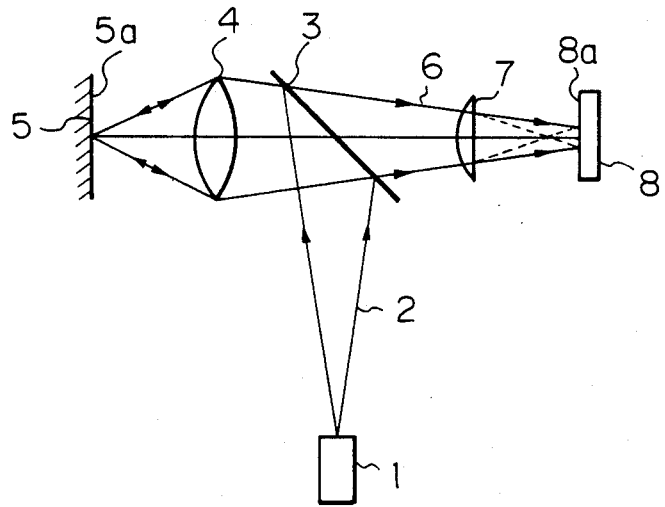
FIG. 1 is a schematic diagram of an example of the optical system used in the optical recording/playing back system.

Before entering into the explanation of the embodiments of the present invention, reference is first made to FIG. 1 in which a typical optical system used in the optical recording/playing back systems is illustrated.

In FIG. 1, the reference numeral 1 represents a light source and a beam emitted by this light source 1 is designated at 2. The beam 2 is reflected by a beam spritter 3 and directed to a record medium 5. The reference numeral 4 indicates an objective lens which focuses the beam reflected at the beam spritter 3 into an information surface 5a of the record medium 5. After reflection at the information surface 5a, the beam travels substantially the same path of the incident beam through the objective lens 4 and passes through the beam spritter 3. After that, the reflected beam which is indicated at 6 passes through a cylindrical lens 7 for providing astigmatism. After passing through the cylindrical lens 7, the beam converges into a position of a light detector 8. Between two focal lines, i.e. a vertical line focus and a horizontal line focus, of astigmatic beam through the cylindrical lens 7, there is a position in which the cross-section of the beam becomes a circle. The light detector 8 is disposed so that a light receiving surface 8a is placed in this position and the circular beam is received by the light detector 8.

Figure 2:
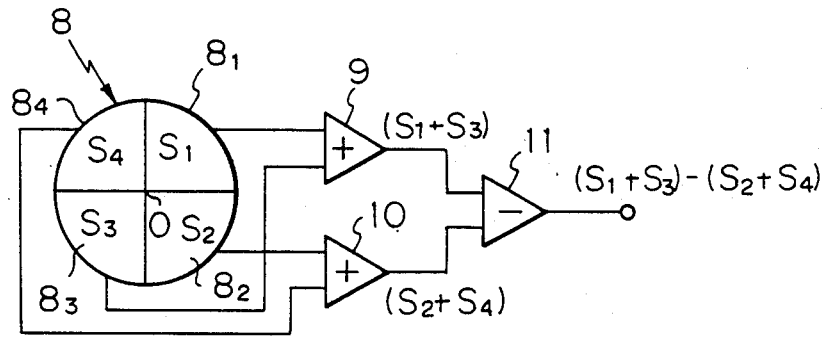
FIG. 2 is a block diagram showing an example of the conventional focus error detection device.

As shown in FIG. 2, the light detector 8 is of the so called quadrants type and it is made up of four independent light receiving elements $8_1$ through $8_4$ which are arranged side by side with two boundary lines therebetween crossing at substantially right angles.

Output signals of two light receiving elements $8_1$ and $8_3$ of this light detector which are diagonally or symmetrically disposed with respect to the center O of the light receiving surface 8a are applied to an adder 9. On the other hand, output signals of two light receiving elements $8_2$ and $8_4$ are applied to adder 10. Output sum signals of the adders 9 and 10 are then applied to a subtractor 11 in which a differential signal of input signals is derived and in turn output as a focus error signal.

In accordance with this differential output signals, the focus control of the optical system of FIG. 1 is performed.

Figures 3A, 3B, 3C:
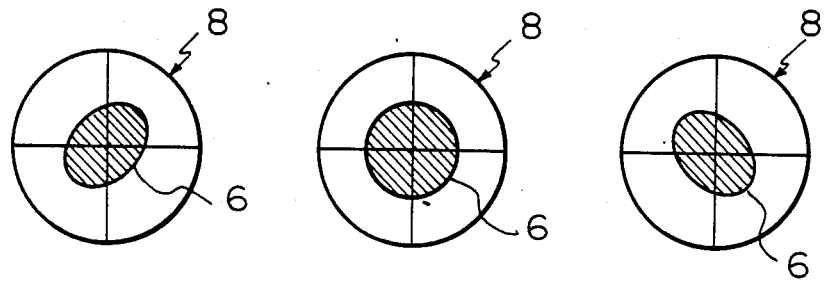
FIGS. 3A through 3C are diagrams showing the form of light beam applied on the light receiving surface of the light detector shown in FIG. 2 under various focus conditions.

The operation of the device is as follows. When the record medium 5 is in the "in-focus" position, the reflected beam is received by the light receiving surface 8a of the light detector 8 and distributed thereon as schematically illustrated in FIG. 3B. In this state, the focus error signal FE is expressed by the following equation (1):

$$FE = (S_1 + S_3) - (S_2 + S_4) = 0 \quad (1)$$

where Si (i = 1, 2, 3, 4) is a low frequency component of each of the output signals of the light receiving elements $8_1$ through $8_4$.

On the other hand, if the record medium 5 is deviated from the "in-focus" position, the distribution of the reflected beam becomes polarized as illustrated in FIG. 3A or FIG. 3C. Therefore, the focus error signal FE has a value greater or smaller than 0 (FE>0 or FE<0). This means that the direction and the magnitude of the focus error is determined according to the sign and the level of the focus error signal.

Thus, with the conventional focus error detection system, the focus error signal is obtained as a differential signal between two sum signals each of which is generated by adding the output signal of two light receiving elements arranged symmetrically with respect to the center of the light detector. Therefore, if the beam is shifted in a direction tangential with the recording track or a direction perpendicular thereto for the purpose of tracking control or for compensation of jitter, the focus error signal may include an off-set potential due to the change in the distribution of the light beam on the light receiving surface of the light detector.

Also, there is a method disclosed in publications such as the Japanese Patent Publication No. 56-42060, in which the off-set level is reduced in such a manner that the deviation of the position of the beam is detected and the focus error signal is compensated by a detection signal obtained by this deviation detection process.

However, this type of system also has a drawback that the multiplicity of circuit elements such as subtracting circuits and multiplying circuits are required. Accordingly the circuit construction was complicated which in turn resulted in a relatively high cost.

The present invention is contemplated to obviate these problems of conventional devices and to provide a focus error differential system in which the off-set of the focus error signal which is caused by the deviation of the beam on the light receiving surface of the light detector is by far reduced.

According to the present invention, the output signals of two light receiving elements arranged symmetrically with respect to the center of the light receiving surface of the light detector are multiplied with each other, and the focus error signal is obtained by the subtraction between the thus obtained two multiplication signals.

The first embodiment of the focus error detection device according to the present invention will be described hereinafter with reference to the accompanying drawings.

Figure 4:
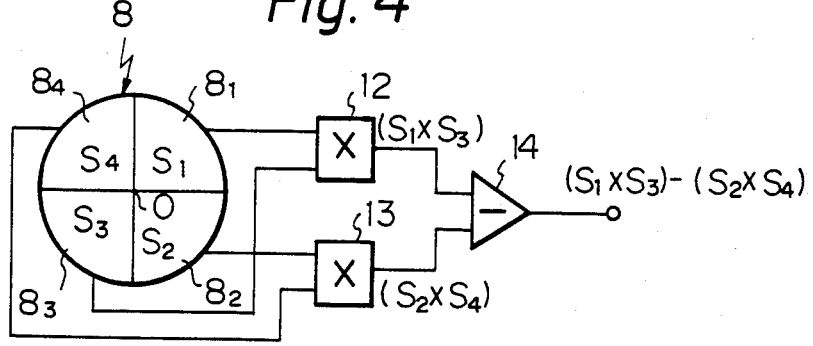
FIG. 4 is a block diagram of a first embodiment of the focus error detection device of the present invention.

In FIG. 4, the light detector 8 is identical with the conventional light detector, and therefore has four light receiving elements $8_1$ through $8_4$. Output signals of two light receiving elements $8_1$ and $8_3$ which are arranged symmetrically with respect to the center of the light detector 8 are multiplied at a multiplier 12. Similarly, output signals of two light receiving elements $8_2$ and $8_4$ which are also arranged symmetrically with respect to the center of the light detector 8 are multiplied at a multiplier 13. Each output signal from multipliers 12 and 13 is then applied to a subtractor 14 in which a subtraction between two input signal takes place. Then a subtraction signal from the subtractor 14 is output as a focus error detection signal.

The level of the focus error detection signal is calculated as follows:

$$FE = (S_1 \times S_3) - (S_2 \times S_4) \quad (2)$$

where Si (i = 1, 2, 3, 4) is a low frequency component of the output signals of each light receiving elements $8_1$ through $8_4$.

Figure 5:
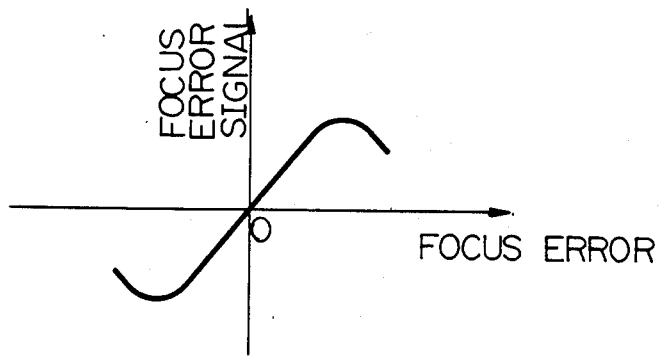
FIG. 5 is a graph showing the variation of the focus error signal with respect to the focus error.

FIG. 5 illustrates the level of the focus error signal with respect to the magnitude of the focus error. As shown, the direction and the magnitude of focus error can be detected by means of the sign and the level of the focus error signal. Further, the "in-focus" state is always maintained by a servo control of such an element as objective lens 4 of FIG. 1 in accordance with this focus error signal.

Figure 6:
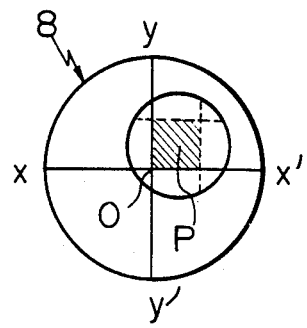
FIG. 6 is a diagram showing a state in which the center of the reflection light beam is deviated from the center of the light receiving surface of the light detector.

With this system, if the position of the beam is shifted in the direction tangential with the recording track or the direction perpendicular thereto, for the purpose of tracking control or jitter compensation, the center of the beam on the light receiving surface of the light detector 8 is dislocated from the center of the light receiving surface of the light detector. As an example, this state is illustrated in FIG. 6, in which the center of the beam P on the light receiving surface 8a is dislocated from the center O of the light receiving surface 8a of the light detector 8.

Under this condition, if the focus error signal is derived by the conventional method as indicated by the equation (1), the off-set will be inevitably produced even in the "in-focus" position due to the deviation of the center of the beam on the light receiving surface. Assuming that the intensity distribution of the beam is approximately uniform, this off-set is represented by an area of a square portion covered by the oblique lines of FIG. 6 in which the dotted lines which form two edges of the square covered by the oblique lines respectively represent a line symmetrical with the boundary line xx' or yy' of the light detector 8 with respect to the center P of the beam.

The following is a discussion about a measure for obtaining a focus error signal which is not affected by the deviation of the position of the center of the beam. In this measure, the focus error signal is obtained by a subtraction of the off-set originated by the error of the position of the center of the beam on the light receiving surface from a result of the operation according the equation (1) of the conventional method.

If the signal level obtained according to the equation (1) is rewritten as FE', the following equations will be obtained.

$$FE = FE' - D \quad (3)$$

and $$FE' = (S_1 + S_3) - (S_2 + S_4) \quad (4)$$

where D represents the level of the off-set component and FE represents the focus error signal which is not affected by the deviation of the position of the beam.

Assuming that the level of the off-set component D corresponds to the area of the square portion covered by the oblique lines of FIG. 6, the component D will be expressed approximately as follows by using a simple geometrical calculation.

$$D \approx \frac{[(S_1 + S_4) - (S_2 + S_3)][(S_1 + S_2) - (S_3 + S_4)]}{(S_1 + S_2 + S_3 + S_4)} \quad (5)$$

By substituting equation (5) for equation (3), the following equation (6) will be obtained:

$$FE = \frac{4[(S_1 \times S_3) - (S_2 \times S_4)]}{(S_1 + S_2 + S_3 + S_4)} \quad (6)$$

It will be appreciated that the numerator of the equation (6) is the operation according to the present invention. The result of the calculation of the equation (2) provides the focus error signal in which the off-set due to the deviation of the center of the light beam is reduced and which is not affected by the deviation of the position of the light beam.

Figure 7:
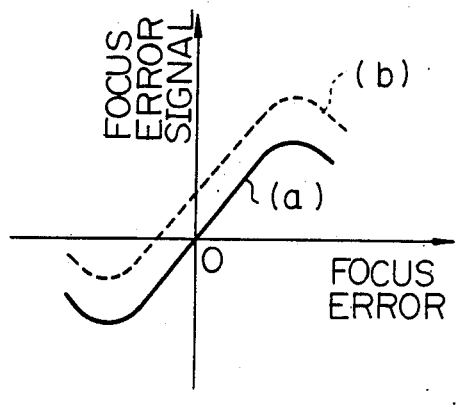
FIG. 7 is a graph showing the variation of the focus error signal under the condition illustrated in FIG. 6.

FIG. 7 shows the variation of the focus error signal with respect to the deviation of the position of the light beam, under the state where the deviation of the position of the light beam such as shown in FIG. 6 is present. The dotted line (b) indicates the focus error signal of the conventional device in which the operation according to the equation (1) takes place. As shown by the solid line (a), the focus error signal of the device of the present invention has very small off-set due to the deviation of the center of the light beam on the light receiving surface, as compared with the focus error signal of the conventional device.

Figure 8:
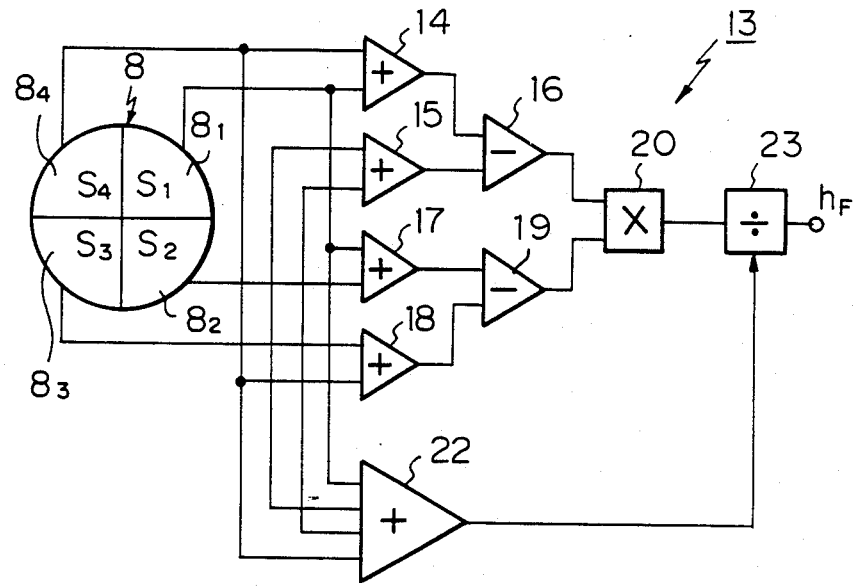
FIG. 8 is a block diagram of a second embodiment of the focus error detection device of the present invention.

FIG. 8 shows a second embodiment of the focus error detection device of the present invention.

As shown, the device includes, in addtition to the circuit elements of FIG. 4, an adder 15 which receives the output signals of the light receiving elements $8_1$ through $8_4$, and a dividing circuit 16 which is connected to the subtractor 14 and receives an output signal of the adder 15. With this arrangement, the subtraction output signal from the subtractor 14 is divided by the output signal of the adder 15 at the dividing circuit 16 and output as the focus error signal. In the case of this embodiment, the focus error signal is standardized by the total amount of the light received by the light detector 8. Thus, the stability of the operation of the focus servo system can be improved by maintaining the uniformity of servo gain against the fluctuation of the intensity of reflected light as a result of the local deviation of the light reflectance of the record medium 5 which may be produced during the manufacturing process.

Moreover, if the deviation of the position of the light beam on the light receiving surface of the light detector 8 is extremely large and only one of light receiving elements is supplied with the reflected light as illustrated in FIG. 9, the focus error signal FE according to the present invention will be equal to zero (FE=0) even though such an extreme deviation is not likely to occur, the control may be secured by adding an appropriate level of focus error signal generated according to the mathematical operation of (1) to the focus error signal obtained through the present device.

It will be appreciated from the foregoing, according to the present invention, a focus error detection device is presented in which the output signals of two light receiving elements, which are arranged symmetrically with respect to the center of the light detector, are multiplied with each other, and the focus error signal is derived by the subtraction between the thus provided multiplication signals. Thus, the off-set of the focus error signal which has been caused by the deviation of the center of the light from the center of the light detector is by far reduced by employing a relatively simple circuit construction and without any additional optical parts. Further, with the focus error detection device of the present invention, a stable control of the focus position is realized.

What is claimed is:

1. A focus error detection device to be used in an optical system for recording/playing back information on and from a record medium, comprising:
   a light detector having first to fourth light receiving elements which are arranged on the side of two boundary lines crossing substantially at right angles with each other;
   an optical means for directing a reflection light beam from a surface of the record medium to a light receiving surface of said light detector in such a manner as to provide an astigmatic focus; and
   an operation circuit means for deriving a focus error signal, including first multiplication means for generating a first multiplication signal by multiplying with each other output signals of said first and third light receiving elements which are arranged symmetrically with respect to a center of said light detector, second multiplication means for generating a second multiplication signal by multiplying with each other output signals of said second and fourth light receiving elements which are arranged symmetrically with respect to the center of said light detector, and a subtraction means connected to said first and second multiplication means for generating a differential signal between said first and second multiplication signals.

2. A focus error detection device as set forth in claim 1, further comprising a summation means connected to said light receiving elements for generating a sum signal by adding output signals of said first to fourth light receiving elements, and a dividing means connected to said subtraction means for dividing said differential signal with said sum signal.

* * * * *